United States Patent
Batres et al.

(10) Patent No.: US 9,529,608 B2
(45) Date of Patent: Dec. 27, 2016

(54) THREAD-AGILE EXECUTION OF DYNAMIC PROGRAMMING LANGUAGE PROGRAMS

(71) Applicant: Microsoft Corporation, Redmond, WA (US)

(72) Inventors: Stefan R. Batres, Sammamish, WA (US); Geoffrey M. Kizer, Seattle, WA (US); Gaurav Seth, Redmond, WA (US); Amanda K. Silver, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/210,129

(22) Filed: Mar. 13, 2014

(65) Prior Publication Data

US 2014/0196053 A1 Jul. 10, 2014

Related U.S. Application Data

(63) Continuation of application No. 13/437,942, filed on Apr. 3, 2012, now Pat. No. 8,694,961.

(51) Int. Cl.
*G06F 9/445* (2006.01)
*G06F 9/44* (2006.01)
*G06F 9/48* (2006.01)

(52) U.S. Cl.
CPC ........... *G06F 9/445* (2013.01); *G06F 9/4428* (2013.01); *G06F 9/4843* (2013.01)

(58) Field of Classification Search
CPC ...... G06F 9/4856; G06F 9/445; G06F 9/4843; G06F 9/4428
See application file for complete search history.

(56) References Cited

U.S. PATENT DOCUMENTS

| 5,297,283 A | * | 3/1994 | Kelly, Jr. | ............ G06F 9/4428 718/104 |
| 6,081,665 A | * | 6/2000 | Nilsen | ............ G06F 9/4428 711/E12.011 |

(Continued)

OTHER PUBLICATIONS

Attardi, Giuseppe, et al., Techniques for dynamic software migration, [Online] 1998, Proceedings of the 5th Annual ESPRIT Conference (ESPRIT'88) 1988, [Retrieved from the Internet] <http://citeseerx.ist.psu.edu/viewdoc/download?doi=10.1.1.47.2525&rep=rep1&type=pdf> pp. 15.*

(Continued)

*Primary Examiner* — Thuy Dao
*Assistant Examiner* — Ravi K Sinha
(74) *Attorney, Agent, or Firm* — Kevin Sullivan; Kate Drakos; Micky Minhas

(57) ABSTRACT

Methods, systems, and products are provided for thread-agile dynamic programming language ('DPL') program execution. Thread-agile DPL program execution may be carried out by receiving, in a message queue, a message for an instance of a DPL program and determining whether the host application has a stored state object for the instance of the DPL program identified by the message. If the host application has a stored state object for the DPL program, thread-agile DPL program execution may also carried out by retrieving the state object; preparing a thread available from a thread pool for execution of the instance of the DPL program in dependence upon the state object and an execution context for the instance of the DPL program; providing, to an execution engine for executing the DPL program, the state object and the prepared thread; and passing the message to the execution engine.

18 Claims, 6 Drawing Sheets

(56) References Cited

U.S. PATENT DOCUMENTS

| | | | | |
|---|---|---|---|---|
| 6,105,074 | A * | 8/2000 | Yokote | G06F 9/445 719/328 |
| 6,275,983 | B1 * | 8/2001 | Orton | G06F 9/445 717/116 |
| 6,345,313 | B1 * | 2/2002 | Lindholm | G06F 9/52 718/100 |
| 6,434,591 | B1 * | 8/2002 | Watakabe | G06F 9/4843 714/E11.192 |
| 6,557,168 | B1 * | 4/2003 | Czajkowski | G06F 9/4428 713/375 |
| 6,687,729 | B1 * | 2/2004 | Sievert | G06F 9/4843 718/100 |
| 6,711,739 | B1 * | 3/2004 | Kutcher | G06F 9/4843 717/114 |
| 6,892,200 | B2 | 5/2005 | Eich | |
| 7,007,266 | B1 | 2/2006 | Isaacson | |
| 7,165,239 | B2 * | 1/2007 | Hejlsberg | G06F 9/4428 717/114 |
| 7,191,441 | B2 * | 3/2007 | Abbott | G06F 9/4843 711/129 |
| 7,200,848 | B1 * | 4/2007 | Slaughter et al. | 719/317 |
| 7,734,958 | B1 | 6/2010 | Di Fabbrizio et al. | |
| 7,748,004 | B2 * | 6/2010 | Patiejunas | H04L 29/06 709/202 |
| 8,001,536 | B2 * | 8/2011 | Usov | 717/139 |
| 8,065,659 | B1 | 11/2011 | Prince et al. | |
| 8,095,910 | B2 | 1/2012 | Nathan et al. | |
| 8,191,040 | B2 | 5/2012 | Hejlsberg et al. | |
| 8,312,467 | B2 * | 11/2012 | Chen | G06F 9/5038 718/107 |
| 8,418,131 | B2 | 4/2013 | Emmelmann | |
| 8,490,052 | B2 | 7/2013 | Shukla et al. | |
| 2002/0046230 | A1 * | 4/2002 | Dieterich | G06F 9/4843 718/107 |
| 2002/0161816 | A1 * | 10/2002 | Kawahara | G06F 9/4843 718/103 |
| 2003/0212736 | A1 * | 11/2003 | Kotnur | G06F 9/4843 709/202 |
| 2004/0015920 | A1 * | 1/2004 | Schmidt | G06F 9/445 717/153 |
| 2004/0133891 | A1 * | 7/2004 | Dahlstedt | G06F 9/4843 718/100 |
| 2004/0148283 | A1 * | 7/2004 | Harris | G06F 9/4843 |
| 2004/0237073 | A1 * | 11/2004 | Wu et al. | 717/154 |
| 2005/0015775 | A1 * | 1/2005 | Russell | G06F 9/4428 719/315 |
| 2005/0216825 | A1 | 9/2005 | Teague | |
| 2005/0262493 | A1 * | 11/2005 | Schmidt | G06F 9/4428 717/164 |
| 2006/0271395 | A1 * | 11/2006 | Harris | G06F 9/45504 718/1 |
| 2007/0011660 | A1 * | 1/2007 | Garyali | G06F 9/445 717/127 |
| 2008/0148284 | A1 | 6/2008 | Epstein | |
| 2008/0256513 | A1 | 10/2008 | Nathan et al. | |
| 2008/0295107 | A1 | 11/2008 | Muscarella | |
| 2010/0095272 | A1 | 4/2010 | Shukla et al. | |
| 2010/0199052 | A1 * | 8/2010 | Inoue et al. | 711/154 |
| 2011/0082984 | A1 * | 4/2011 | Yuan | G06F 17/30902 711/147 |
| 2011/0247018 | A1 * | 10/2011 | Farrar | G06F 9/4843 719/328 |
| 2012/0072913 | A1 * | 3/2012 | Uola | G06F 9/445 718/100 |
| 2012/0179808 | A1 | 7/2012 | Bergkvist et al. | |
| 2012/0191840 | A1 * | 7/2012 | Gordon | 709/223 |
| 2013/0145361 | A1 * | 6/2013 | Kaegi | 717/176 |
| 2013/0275942 | A1 | 10/2013 | Trebas et al. | |
| 2014/0013333 | A1 * | 1/2014 | Mishaeli | G06F 9/445 718/108 |

OTHER PUBLICATIONS

William Stallings, Operating Systems: Internals and Design Principles, 2009, Upper Saddle River, NJ: Prentice Hall, 6th edition, Chapter 4: pp. 160-204.*

Castro et al., Before-Commit Client State Management Services for AJAX Applications, [Online] Nov. 2006, Hot Topics in Web Systems and Technologies, 2006. HOTWEB '06. 1st IEEE Workshop on, [Retrieved from the Internet] <http://ieeexplore.ieee.org/stamp/stamp.jsp?tp=&arnumber=4178386> 12 pages.*

Martinsen et al., The Effect of Thread-Level Speculation on a Set of Well-known Web Application, [Online] Nov. 2011, In Fourth Swedish Workshop on Multi-Core Computing (MCC-11), [Retrieved from the Internet] <http://www.diva-portal.org/smash/get/diva2:834949/FULLTEXT01.pdf> 7 pages.*

Schippers et al., Towards an actor-based concurrent machine model, [Online] 2009, In Proceedings of the 4th workshop on the Implementation, Compilation, Optimization of Object-Oriented Languages and Programming Systems (ICOOOLPS '09). ACM, New York, NY, USA, [Retrieved from the Internet] <http://dx.doi.org/10.1145/1565824.1565825> pp. 4-9.*

Curley et al., Recovering from Distributable Thread Failures with Assured Timeliness in Real-Time Distributed Systems, [Online] 2006, 25th IEEE Symposium on Reliable Distributed Systems (SRDS'06), Leeds, [Retrieved from the Internet] <http://ieeexplore.ieee.org/stamp/stamp.jsp?tp=&arnumber=4032488&isnumber=4032455> pp. 267-276.*

Mars et al., Contention aware execution: online contention detection and response, [Online] 2010, in Proceedings of the 8th annual IEEE/ACM international symposium on Code generation and optimization (CGO '10). ACM, New York, NY, USA, [Retrieved from the Interent] <http://dx.doi.org/10.1145/1772954.1772991> pp. 257-265.*

G. D. Benson, State management for distributed Python applications, [Online] 2008, IEEE International Symposium on Parallel and Distributed Processing, IPDPS 2008, Miami, FL, [Retrieved from the Internet] <http://ieeexplore.ieee.org/stamp/stamp.jsp?tp=&arnumber=4536151&isnumber=4536075> pp. 1-8.*

Dave Bollinger, Multiple Scripts, Pausing, Threads, and Persistant Variables, [Online] Mar. 20, 2000, [Retrieved from the Internet] <http://lua-users.org/lists/lua-l/2000-03/msg00072.html> 4 pages.

Stackoverflow: Node.js—Pausing script execution in another thread, [Online] Mar. 5, 2012, [Retrieved from the internet] <http://stackoverflow.com/questions/9562193/node-js-pausing-script-execution-in-another-thread> 3 pages.

Ha, et al., "A Concurrent Trace-based Just-In-Time Compiler for Single-threaded JavaScript", Retrieved at <<http://www.cs.utexas.edu/users/habals/papers/cjit-pespma09.pdf>> ACM SIGPLAN Conference on Object-Oriented Programming, Systems, Languages, and Applications (OOPSLA), Orlando, FL, Oct. 2009, pp. 395-408.

Niyoga, Shanku, "The New JavaScript Engine in Internet Explorer 9", Retrieved at <<http://blogs.msdn.com/b/ie/archive/2010/03/18/the-new-javascript-engine-in-internet-explorer-9.aspx>> Mar. 18, 2010, pp. 12.

Walker, Grace, "HTML5 fundamentals, Part 3: The power of HTML5 APIs", Retrieved at <<http://www.ibm.com/developerworks/web/library/wa-html5fundamentals3/>> Jun. 7, 2011, pp. 16.

* cited by examiner

THREAD-AGILE EXECUTION OF DYNAMIC PROGRAMMING LANGUAGE PROGRAMS

CROSS-REFERENCE TO RELATED APPLICATIONS

This application is a continuation of U.S. patent application Ser. No. 13/437,942, filed Apr. 3, 2012, entitled "THREAD-AGILE EXECUTION OF DYNAMIC PROGRAMMING LANGUAGE PROGRAMS," which is incorporated herein by reference in its entirety.

BACKGROUND

Dynamic programming language ('DPL') is a term used in computer science to describe a class of high-level programming languages that perform, at runtime, many common behaviors that other languages perform during compilation. Some examples of such behaviors may include extending the program by adding new code, extending objects and definitions, or modifying the types associated with objects and variables, all during program execution rather than compilation. Executing a program developed in a DPL is typically single threaded in nature and the execution context of such programs is typically thread-affinitized throughout the lifetime the program execution to the thread on which the program was initially created.

SUMMARY

Methods, systems, and products are provided for thread-agile dynamic programming language ('DPL') execution. Embodiments may include receiving, in a message queue by a host application, a message for an instance of a DPL program. Upon receipt of the message, the host application may determine whether the host application has a stored state object for the instance of the DPL program that was identified by the message. The stored state object may contain the state of the instance of the DPL program when the instance of the DPL program was last executed. If the host application has a stored state object for the instance of the DPL program, the host application can retrieve the state object and subsequently prepare a thread available from a thread pool for execution of the instance of the DPL program. The host application may further provide the state object and the prepared thread to an execution engine for executing the DPL program. The host application may also pass the message to the execution engine, determine whether the instance of the DPL program has paused execution, and store the current state of the DPL program in a state object if the instance of the DPL program has paused execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF EXAMPLE EMBODIMENTS

Figure 1:
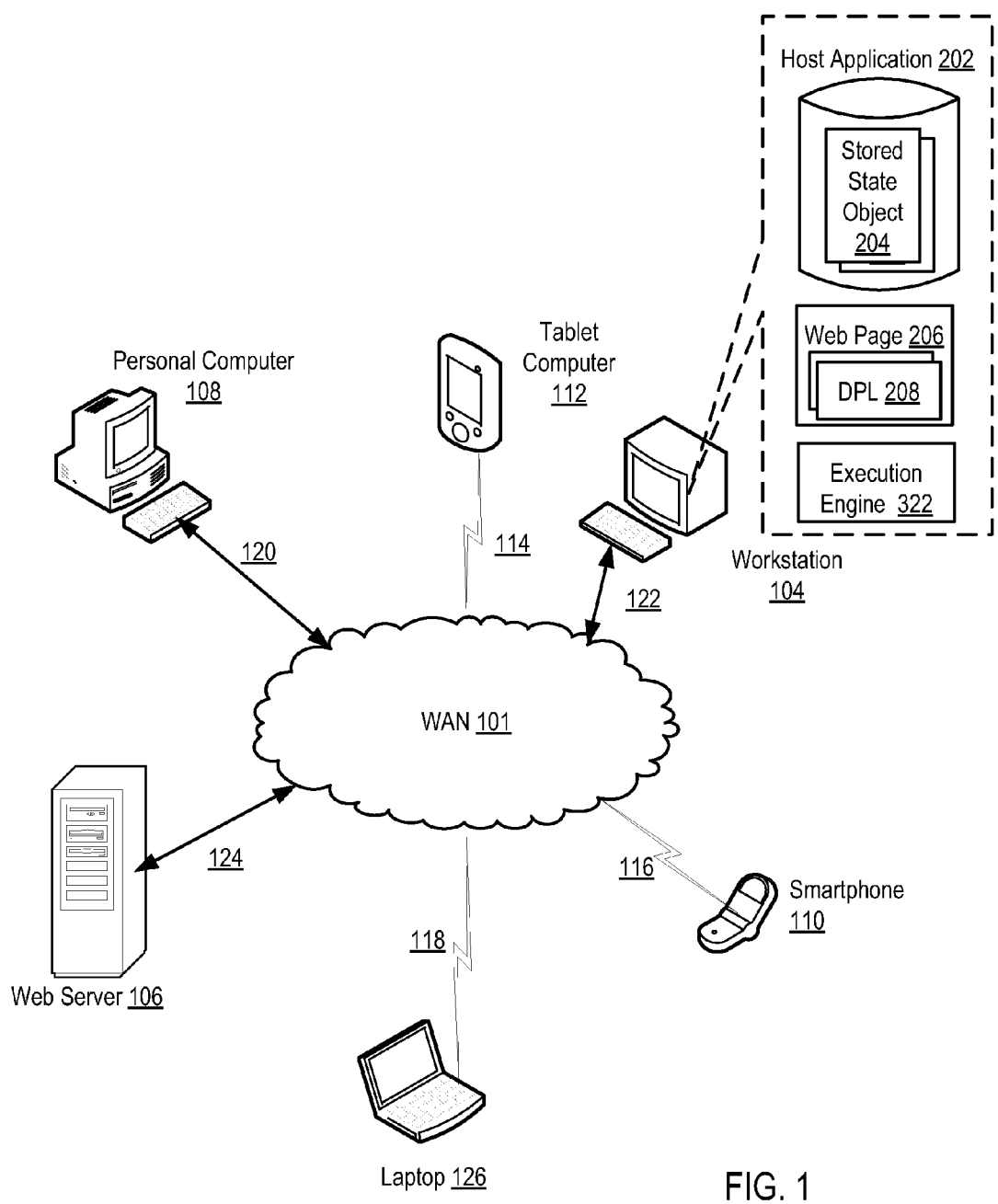
FIG. 1 sets forth a network diagram that includes a number of computers capable of thread-agile DPL program execution.

Example methods, systems, and products for thread-agile dynamic programming language ('DPL') program execution are described with reference to the accompanying drawings, beginning with FIG. 1. FIG. 1 sets forth a network diagram that includes a number of computers capable of thread-agile DPL program execution. Dynamic programming language is a term used in computer science to describe a class of high-level programming languages that perform at runtime many common behaviors that other languages might perform during compilation, if at all. These behaviors often include extension of the program, adding new code, extending objects and definitions, modifying the type system, and others all during program execution rather than compilation. These behaviors can be emulated in nearly any language of sufficient complexity, but DPLs provide direct tools to make use of them. Examples of a DPL include ActionScript™, BASIC™, BeanShell™, Clojure™, ColdFusion™, Common Lisp™ and most other Lisps™, Groovy™, JavaScript™, VBScript™, MATLAB™, Lua™, Objective-C™, Perl™, PHP™, Powershell™, Python™, Ruby™, Smalltalk™, Tcl™, Dolphin Smalltalk™.

Dedicating a single thread to a program developed in a DPL may result in the inefficient use of the thread because a DPL may be idle for a period of time thereby rendering the thread ineffective for the period that the DPL remains idle. For example, the thread may be inefficiently used when the DPL program is not executing, the thread may be inefficiently used when the DPL program is waiting on a message, and so on. The inefficient use of such threads may result in poor system performance, including but not limited to poor runtime performance, inefficient system resource utilization, and poor event processing throughput.

One particular example of a DPL program whose execution may be improved with thread-agile DPL program execution is a web worker. A web worker, as defined by the World-Wide Web Consortium™ ('W3C') and the Web Hypertext Application Technology Working Group™ ('WHATWG'), is a JavaScript™ script. The web worker can be executed from a HyperText Markup Language ('HTML') page and the web worker runs in the background, independently of other user-interface scripts that may also have been executed from the same HTML page. Web workers can be used to perform computationally expensive tasks without interrupting the user interface.

Programs developed using a DPL are typically executed in a host application that executes the DPL program using an execution engine. An example of a host application is a web browser that renders web pages that contain DPL programs such as scripts. A web browser, such as Internet Explorer™ from Microsoft™, Firefox™ from Mozilla™, or Safari™ from Apple™, is one example of a host application that may be modified for thread-agile DPL program execution. Other examples of host applications for thread-agile DPL program execution that may execute DPL programs include video gaming platforms, operating systems, Immersive or Metrostyle applications such as those created for Windows Runtime™, web servers, applications executing in web servers, mobile applications, and many others as will occur to those of skill in the art.

An execution engine is a module of computer program instructions that execute DPL programs for the host application. A host application may instantiate one or more execution engines to execute the DPL programs. Examples of execution engines useful for DPL program execution include Chakra™ used in Internet Explorer™ from Microsoft™, Rhino™, SpiderMonkey™, and JagerMonkey™ from Mozilla™, and others as will occur to those of skill in the art.

The example system of FIG. 1 includes a number of computing devices coupled for data communications through a wide area network ('WAN') (101). A personal computer (108), a workstation (104), and a web server (106) are coupled for data communications with the WAN (101) through a wireline connection (120, 122, and 124). A tablet computer (112), a smartphone (110) and a laptop (126) are coupled for data communications with the WAN (101) through a wireless connection (114, 116, and 118).

Although only one workstation (104) is illustrated with only one-host application (202) and only one execution engine (322), each of the computing devices (104, 106, 108, 110, 112, and 126) of FIG. 1 may execute one or more host applications and one or more execution engines associated with each host application (202) capable of DPL program execution. More particularly, the host application (202) installed on each of the computing devices (104, 106, 108, 110, 112, and 126) of FIG. 1 is capable of receiving, in a message queue, a message. The received message may be directed to an instance of a DPL program (208). In the example of FIG. 1, a number of DPL programs are contained within a web page (206) rendered by the host application (202).

The host application (202) installed on each of the computing devices (104, 106, 108, 110, 112, and 126) of FIG. 1 is further capable of determining whether the host application (202) has a stored state object (204) for the instance of the DPL program identified by the message. The stored state object (204) of FIG. 1 may be embodied, for example, as a data structure that includes state information for an instance of a DPL program. State information for an instance of a DPL program may include, for example, a value of a resumption point for the instance of the DPL program, a global object, a stack pointer, a value for an execution parameter used by the instance of the DPL program, values associated with an operational environment in which the instance of the DPL program was executing, and other variables and objects as will occur to those of skill in the art. The stored state object (204) of FIG. 1 contains the state of the instance of the DPL program when the DPL program last executed as well as member methods for continuing execution of the DPL program, pausing execution of the DPL program, and destroying the state object itself when the DPL program has finished execution.

If the host application (202) has a stored state object for the DPL program, the host application (202) retrieves the state object (204) and prepares a thread available from a thread pool for execution of the instance of the DPL program (208). Preparing a thread may be carried out in dependence upon the state object and an execution context for the instance of the DPL program (208). An execution context for the DPL program (208) is an object that posts work items to a message queue for DPL programs. That is, the execution context has member methods for posting work messages for the DPL program (208). The execution context also associates, with each DPL program (208), one or more resources such as a just-in-time ('JIT') compiler for executing the DPL program (208), a garbage collector for reclaiming memory used by the DPL program, memory available to the thread, a processor assigned to the thread, data communications adapters for use in data communications, and other resources as will occur to those of skill in the art.

The host application (202) installed on each of the computing devices of FIG. 1 is also capable of providing the state object (204) and the prepared thread to an execution engine (322) for executing the DPL program (208). The host application (202) installed on each of the computers of FIG. 1 is also capable of passing the message to the execution engine (322). Passing the message to the execution engine (322) causes the execution engine to execute the DPL program (208).

The host application (202) installed on each of the computing devices of FIG. 1 is also capable of determining whether the instance of the DPL program (208) has paused execution or finished execution. The host application (202) installed on each of the computing devices of FIG. 1 is also capable of storing the current state of the DPL program in a state object (204) if the instance of the DPL program has paused execution. If the instance of the DPL program has finished execution, the host application (202) installed on each of the computing devices of FIG. 1 is also capable of destroying the state object (204) associated with the instance of the DPL program (208). The host capability might be enabled by the execution engine passing a message to the host application of the instance of the DPL program the execution engine is executing.

The arrangement of computing devices and other devices making up the example system illustrated in FIG. 1 are for explanation, not for limitation. Data processing systems useful in thread-agile DPL program execution may include additional servers, routers, other devices, and peer-to-peer architectures, not shown in FIG. 1, as will occur to those of skill in the art. Networks in such data processing systems may support many data communications protocols, including for example Transmission Control Protocol ('TCP'), Internet Protocol ('IP'), HyperText Transfer Protocol ('HTTP'), Wireless Access Protocol ('WAP'), Handheld Device Transport Protocol ('HDTP'), and others as will occur to those of skill in the art. Thread-agile DPL program execution may be implemented on a variety of hardware platforms in addition to those illustrated in FIG. 1.

Thread-agile DPL program execution is generally implemented with computing devices. For further explanation, therefore, FIG. 2 sets forth a functional block diagram of automated computing machinery comprising an example computing device (152) useful in thread-agile DPL program execution. The computing device (152) of FIG. 2 includes at least one computer processor (156) or 'CPU' as well as random access memory (168) ('RAM') which is connected through a high speed memory bus (166) and a bus adapter (158) to the processor (156) and to other components of the computing device (152).

Figure 2:
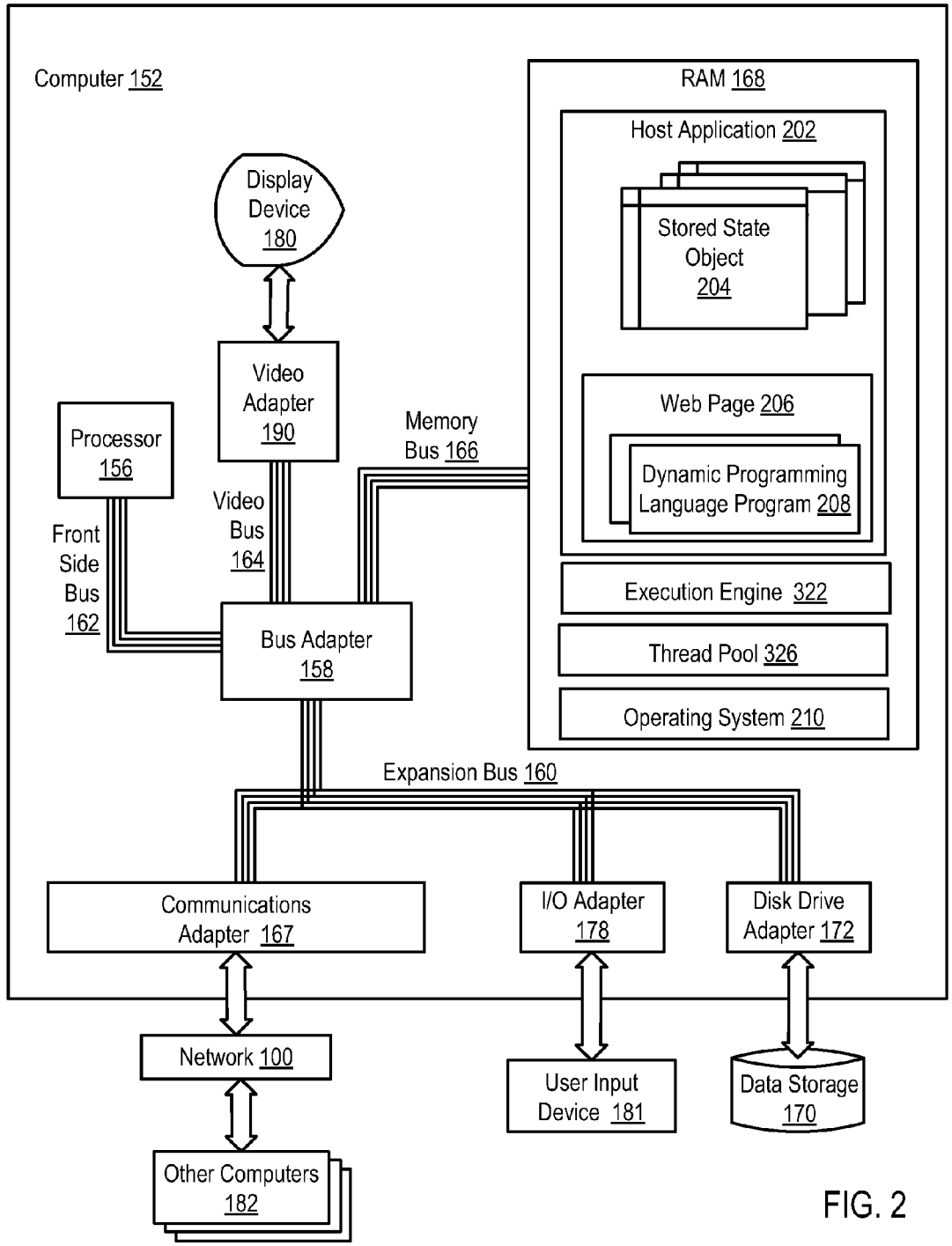
FIG. 2 sets forth a functional block diagram of an example computer useful in thread-agile DPL program execution.

Stored in RAM (168) is at least a portion of the host application (202), a module of computer program instructions for thread-agile DPL program execution. The host application (202) is configured to receive, in a message queue, a message for an instance of a DPL program (208). In the example of FIG. 2, a number of DPL programs (208) are contained within a web page (206) rendered by the host application (202). An example of a host application (202) capable of rendering such a web page (206) is a web browser.

The host application (202) is also configured to determine whether the host application (202) has a stored state object (204) for the instance of the DPL program (208) identified by the message. The stored state object (204) contains the state of the instance of the DPL program (208) when the instance of the DPL program (208) last executed. The stored state object (204) also contains member methods for continuing execution of the DPL program (208), pausing execution of the DPL program (208), and destroying the state object (204) when the instance of the DPL program (208) has finished execution.

If the host application (202) has a stored state object (204) for the instance of the DPL program (208), the host application (202) is configured to retrieve the state object (204) and prepare a thread available from a thread pool for execution of the instance of the DPL program (208). The host application (202) of FIG. 2 prepares the thread by requesting a thread from a thread pool (326). The thread pool (326) of FIG. 2 may be implemented as a pool of threads maintained by an operating system (210), an abstraction of a pool of operating system threads that lies between the operating system and the host, a pool of threads maintained by the host itself, in other ways as will occur to those of skill in the art. Preparing a thread may be carried out in dependence upon the state object (204) and an execution context for the instance of the DPL program (208). As mentioned above, an execution context for the DPL program (208) is an object configured to post work items to a message queue for DPL programs. That is, the execution context has member methods for providing work messages for the DPL program (208) typically implemented through a post( ) member method or the like. The execution context also associates, with each DPL program (208), one or more resources such as a JIT compiler for executing the DPL program, a garbage collector for reclaiming memory used by the DPL program (208), memory available to the thread, a processor assigned to the thread, data communications adapters for use in data communications, and other resources as will occur to those of skill in the art.

The host application (202) of FIG. 2 is also configured to provide the state object (204) and the prepared thread to an execution engine (322) for executing the instance of the DPL program (208). The host application (202) of FIG. 2 is also configured to pass the message to the execution engine (322) for execution. Passing the message to the execution engine (322) causes the execution engine (322) to execute the instance of the DPL program (208).

The host application (202) is also configured to determine whether the instance of the DPL program (208) has paused execution or finished execution. If the instance of the DPL program (208) has paused execution, the host application (202) is configured to store the current state of the DPL program (208) in a state object (204). If the instance of the DPL program (208) has finished execution, the host application (202) is configured to destroy the state object (204) associated with the instance of the DPL program (208).

Also stored in RAM (168) is an operating system (210). Operating systems useful in thread-agile DPL program execution include UNIX™, Linux™, Microsoft Windows 7™, Microsoft Windows 8™, AIX™, IBM's i5/OS™, and others as will occur to those of skill in the art. The operating system (210), host application (202), and execution engine (322) are shown in RAM (168), but many components of such software may also be stored in non-volatile memory such as a disk drive (170). That is, at any given time, only a portion of one or more of the programs depicted in RAM in FIG. 2 may be resident in RAM.

The computing device (152) of FIG. 2 includes a disk drive adapter (172) coupled through an expansion bus (160) and a bus adapter (158) to the processor (156) and other components of the computing device (152). The disk drive adapter (172) connects non-volatile data storage to the computing device (152) in the form of the disk drive (170). Disk drive adapters useful in computing devices for thread-agile DPL program execution include Serial Advanced Technology Attachment ('SATA') adapters, Parallel ATA ('PATA') adapters, Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computing device (152) of FIG. 2 also includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing device (152) of FIG. 2 includes a video adapter (190), which is an example of an I/O adapter specially designed for graphic output to a display device (180) such as a display screen or computer monitor. A video adapter (209) is connected to the processor (156) through a high speed video bus (164), the bus adapter (158), and the front side bus (162), which is also a high speed bus.

The example computing device (152) of FIG. 2 also includes a communications adapter (167) for data communications with other computing devices (182) through a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for thread-agile DPL program execution include modems for wired dial-up communications, Ethernet (IEEE 802.3) adapters for wired data communications, and 802.11 adapters for wireless data communications.

Figure 3:
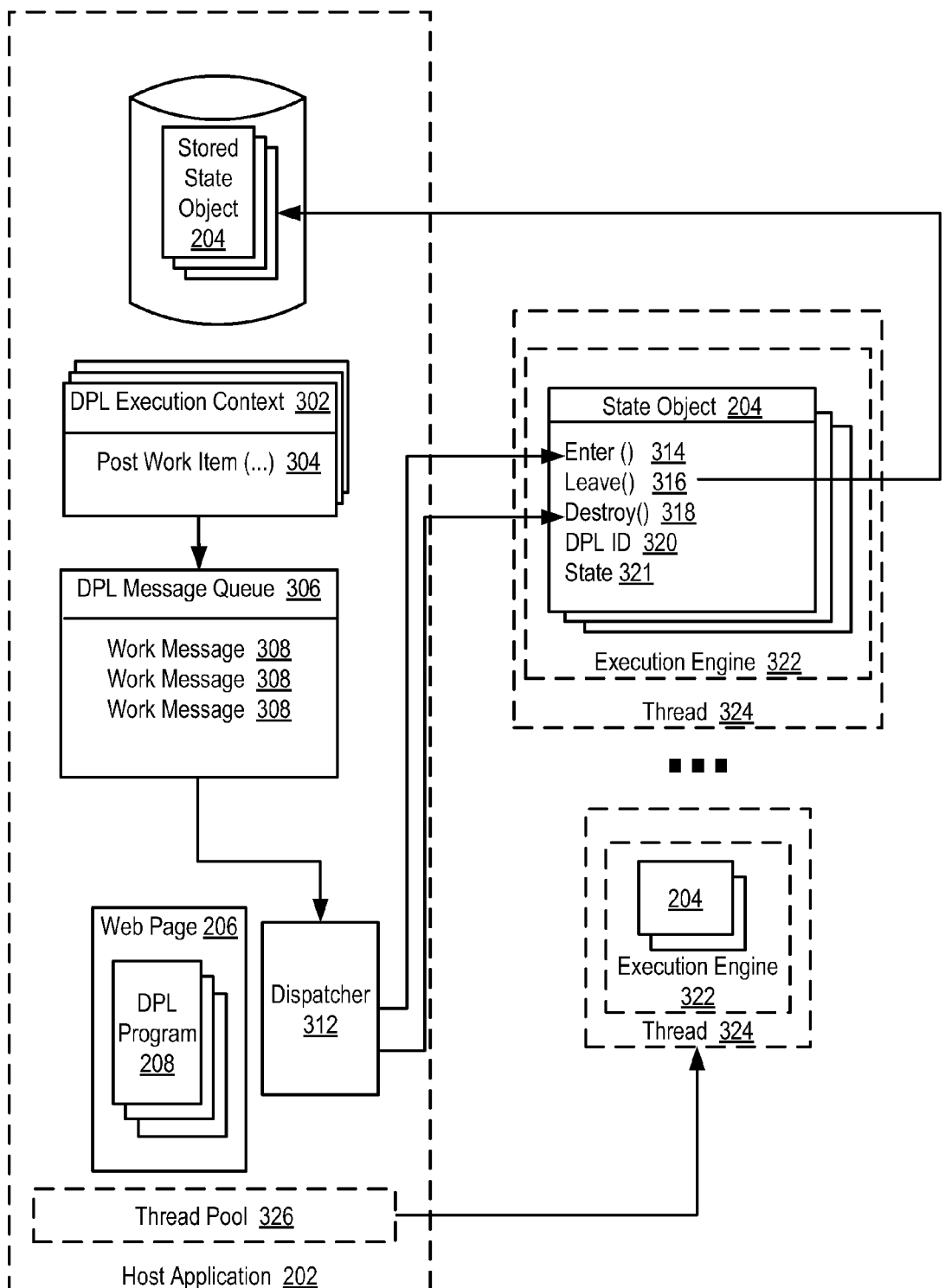
FIG. 3 sets forth a functional block diagram of an example system useful in thread-agile DPL program execution.

For further explanation, FIG. 3 sets forth a functional block diagram illustrating an example system for thread-agile DPL program execution. The example system of FIG. 3 includes a host application (202). The host application (202) of FIG. 3 has a web page (206) to be rendered by the host application. The web page (206) includes a number of DPL programs such as scripts to be executed.

A script is a DPL program that typically maintains state and typically allows control of the state of one or more applications such as, for example, the host application (202) of FIG. 3. Scripts are often distinct from the core code of the application and are usually written in a different language. Scripts can be run by web browsers, for example, to change the appearance or behavior of a web page, such as to change the content to be specific to the current user. Examples of languages for writing scripts include JavaScript™, VBScript™, XUL™, and others as will occur to those of skill in the art.

In the example of FIG. 3, the host application (202) maintains stored state objects (204) for DPL programs (208) included in the web page (206). The state objects (204) of FIG. 3 contain the state (321) of each of the DPL programs when each of those DPL programs last paused execution. An example of when a pause in execution occurs is when the DPL program or the host application is waiting for a response to a message such as a response to an HTTP request message that is sent to a web server.

Associated with each instance of a DPL program (208) in the example of FIG. 3 is a DPL execution context (302). A DPL execution context (302) is an object with member methods to post work messages to an instance of a DPL program (208). A DPL execution context (302) provides an abstraction for posting work items to a message queue for DPL programs and associates with each DPL program (208) one or more resources such as a JIT compiler for executing the DPL program (208), a garbage collector for memory used by the DPL program (208), memory available to the thread, a processor assigned to the thread, data communications adapters for use in data communications, and other resources as will occur to those of skill in the art.

The DPL execution context (302) of FIG. 3 contains a member method PostWorkItem( ) (304) that when called posts a work message (308) to a DPL message queue (306). The DPL message queue (306) receives the messages for one or more instances of a DPL program in the web page (206) rendered by the host application (202).

In the example of FIG. 3, the host application (202) also includes a dispatcher (312), a module of computer program instructions that monitors the DPL message queue (306) and determines whether the host application (202) has a stored state object (204) for the instance of the DPL program (208) identified by the message (308). If the host application (202) has a stored state object (204) for the DPL program (208), the dispatcher (312) retrieves the stored state object (204).

The dispatcher (312) in the example of FIG. 3 requests a thread (324) for execution of the DPL program (208) from the a thread pool (326) of one or more threads (322) available for thread-agile DPL program execution. Upon receipt of the thread (322), the dispatcher (312) prepares the thread (322) for execution of the instance of the DPL program in dependence upon the state object and an execution context for the instance of the DPL program. The dispatcher (312) prepares the thread (322) received from the thread pool (326) by restoring the state of its variables, a resumption point of the instance of the DPL, and other values for execution of the instance of the DPL program in dependence upon the state information maintained in the state object (204) for the DPL program. In the example of FIG. 3, the thread pool (326) is maintained by the host application (202). This is for explanation and not for limitation. In fact, a thread pool may be maintained by the host application, an operating system, by another application, or be maintained in other ways as will occur to those of skill in the art.

The dispatcher (312) also prepares the thread (322) by associating resources such as a JIT compiler, a garbage collector, memory for the thread, a processor for the thread, data communications adapters for the thread, and other resources with the thread (322) in dependence upon the execution context associated with the instance of the DPL program (208). The dispatcher associates these resources by making these resources available to the DPL during its execution.

The example dispatcher (312) of FIG. 3 provides the state object and the prepared thread to an execution engine (322) for executing DPL programs. In many cases, an execution engine (322) associated with a DPL program is maintained in memory by a host application (202). The dispatcher (312) provides the state object (204) and the prepared thread to the execution engine (322) and passes the execution engine (322) the work message. The dispatcher (312) may also call the enter( ) function (314) in the state object (204) parameterized with the DPL program (208), causing the execution engine (322) to execute the DPL program (208). Alternatively, the execution engine (322) may determine that it has an instance of a DPL program ready for execution and may obtain information for its execution from the host application. In cases where the host application (202) has not maintained an execution engine in memory, the dispatcher (312) instantiates an execution engine (322) for the DPL program (208) and provides the state object (204), which might be empty for a new execution engine, and the prepared thread to the instantiated execution engine (322), passes the execution engine (322) the work message, and calls the enter function (314) in the state object (204), causing the execution of the DPL program.

When the example DPL program (208) of FIG. 3 ceases execution, the dispatcher (312) determines whether the DPL program has paused execution or is finished executing. The determination may be carried out by a message from the execution engine, a callback implemented by the dispatcher or in other ways as will occur to those of skill in the art. The DPL program (208) may pause execution when, for example, the DPL program (208) is waiting for a response message necessary to continue executing. In such cases, the dispatcher (312) may call the leave( ) function (316) in the state object (204), causing the state of the DPL program (208) to be stored when execution of the DPL program (208) is paused. The stored state of the DPL program (208) may be retrieved at a later time, for example, when the response message has been received. Alternatively, if the DPL program (208) has finished executing, the dispatcher calls the destroy( ) function (318) in the state object (204), causing the state object to be destroyed such that the state object is deleted and no longer saved.

Figure 4:
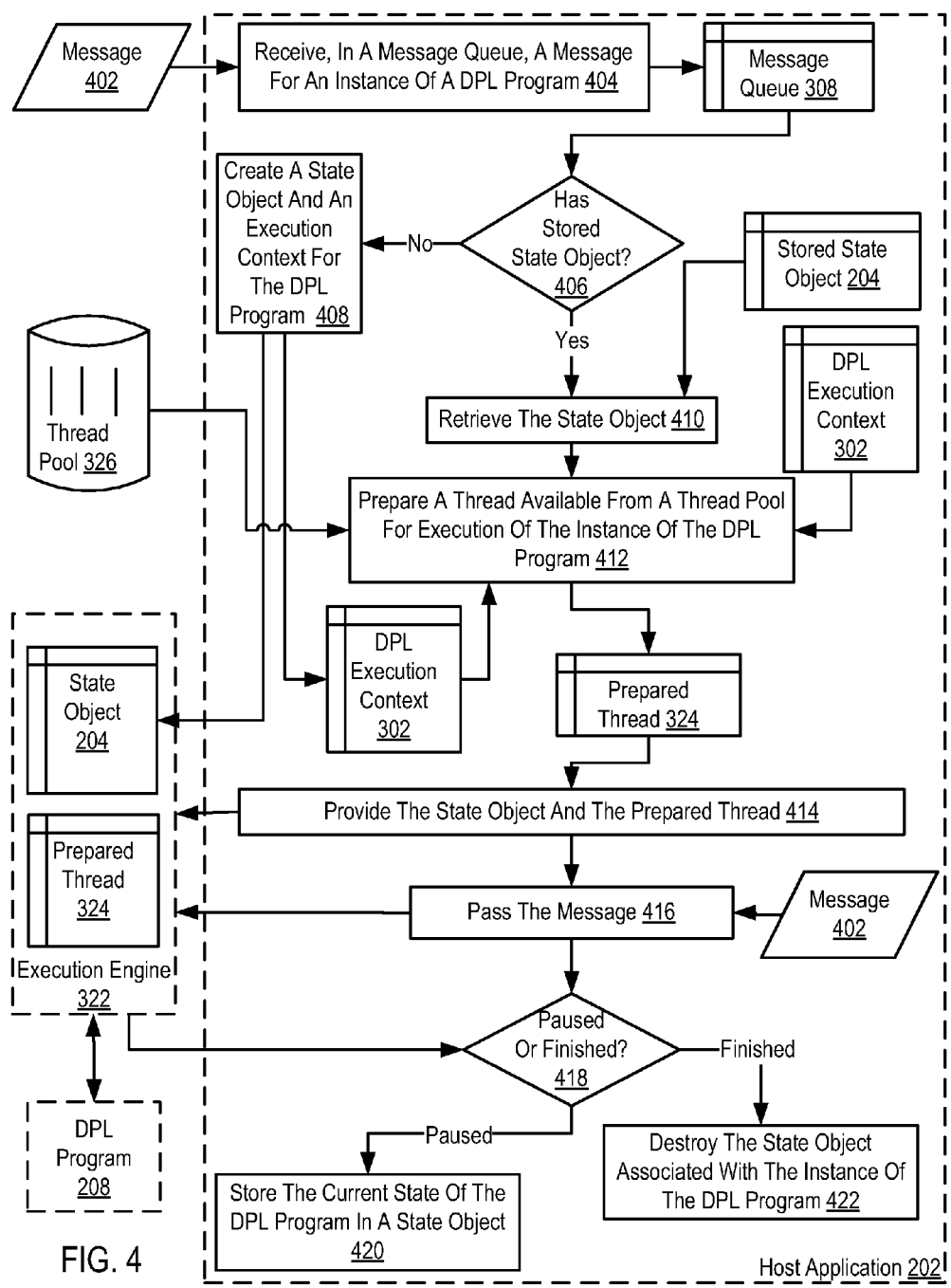
FIG. 4 sets forth a flow chart illustrating an example method of thread-agile DPL program execution.

For further explanation, FIG. 4 sets forth a flow chart illustrating an example method of thread-agile DPL program execution that includes receiving (404), in a message queue (308) by a host application (202), a message (402) for an instance of a DPL program (208). As mentioned above, receiving (404) a message for an instance of a DPL program (208) may be carried out by monitoring a message queue for work messages for DPL programs. The host application (202) may also identify a message in the message queue as being a work message for one of the DPL programs.

The method of FIG. 4 also includes determining (406), by the host application (202), whether the host application (202) has a stored state object (204) for the instance of the DPL program (208) identified by the message. The stored state object (204) of FIG. 4 contains the state of the instance of the DPL program (208) when last executed. In embodiments in which the host application (202) is running on a client machine, the host application might not receive messages for DPL programs that have not yet begun execution. However, in embodiments in which the host application (202) is executing on the server side, a message for a DPL program may arrive prior to initiating the DPL program's (208) execution. In such cases according to the method of FIG. 4, if the host application (202) does not have a stored state object (204) for the DPL program (208), the method of FIG. 4 continues by creating (408), by the host application (202), a state object (204) and an execution context (302) for the DPL program.

If the host application has a stored state object (204) for the DPL program (208), the method of FIG. 4 includes retrieving (410), by the host application (202), the state object (204). Retrieving (410), by the host application (202), the state object (204) may be carried out by identifying and retrieving the state object from memory available to the host application (202).

The method of FIG. 4 also includes preparing (412), by the host application (202), a thread (324) available from a thread pool (326) for execution of the instance of the DPL program (208) in dependence upon the state object (204) and an execution context (302) for the instance of the DPL program (208). Preparing (412) a thread may be carried out by restoring variables for the instance of the DPL program, resumption point for the instance of the DPL program and other variables that will occur to those of skill in the art available to the thread in dependence upon the state object and associating resources with the thread in dependence upon the execution context.

The method of FIG. 4 also includes providing (414), by the host application (202) to an execution engine (322) for executing the DPL program (208), the state object (204) and the prepared thread (324). The host application (202) may also provide the DPL program (208) itself to the execution engine (322).

The method of FIG. 4 also includes passing (416), by the host application (202) to the execution engine (322), the message (402). Passing (416) the message (402) to the execution engine (322) may be carried out by transmitting the message to the execution engine such as by inserting the message in a message queue in the execution engine (322) for the DPL program (208). Passing the message to the execution engine may also be carried out through other data communications such as through shared memory, through network data communications or any other way of transmitting the message to the execution engine. Passing the message to the execution engine (322) will typically cause the execution engine (322) to execute the DPL program (208).

The method of FIG. 4 also includes determining (418), by the host application (202), whether the instance of the DPL program has paused execution. If the instance of the DPL program has paused execution, the method of FIG. 4 may continue by storing (420), by the host application (202), the current state of the DPL program in a state object, stopping or shutting down the execution engine and returning the thread that was being used by the execution engine to the thread pool. The stored state object maintains the state of the DPL program when execution of the DPL program (208) is paused. The state may be restored upon receipt of the next work message needed to continue execution of the DPL program (208).

The method of FIG. 4 also includes determining (418), by the host application (202), whether the instance of the DPL program has finished execution. If the instance of the DPL program has finished execution, the method of FIG. 4 may continue by destroying (422), by the host application (202), the state object (204) associated with the instance of the DPL program (208), closing the execution engine and returning the thread being used by the execution engine to the thread pool. After destroying the state object, the state object is no longer maintained in memory because the DPL program associated with the state object is finished executing and is no longer waiting for further work items to complete execution.

Figure 5:
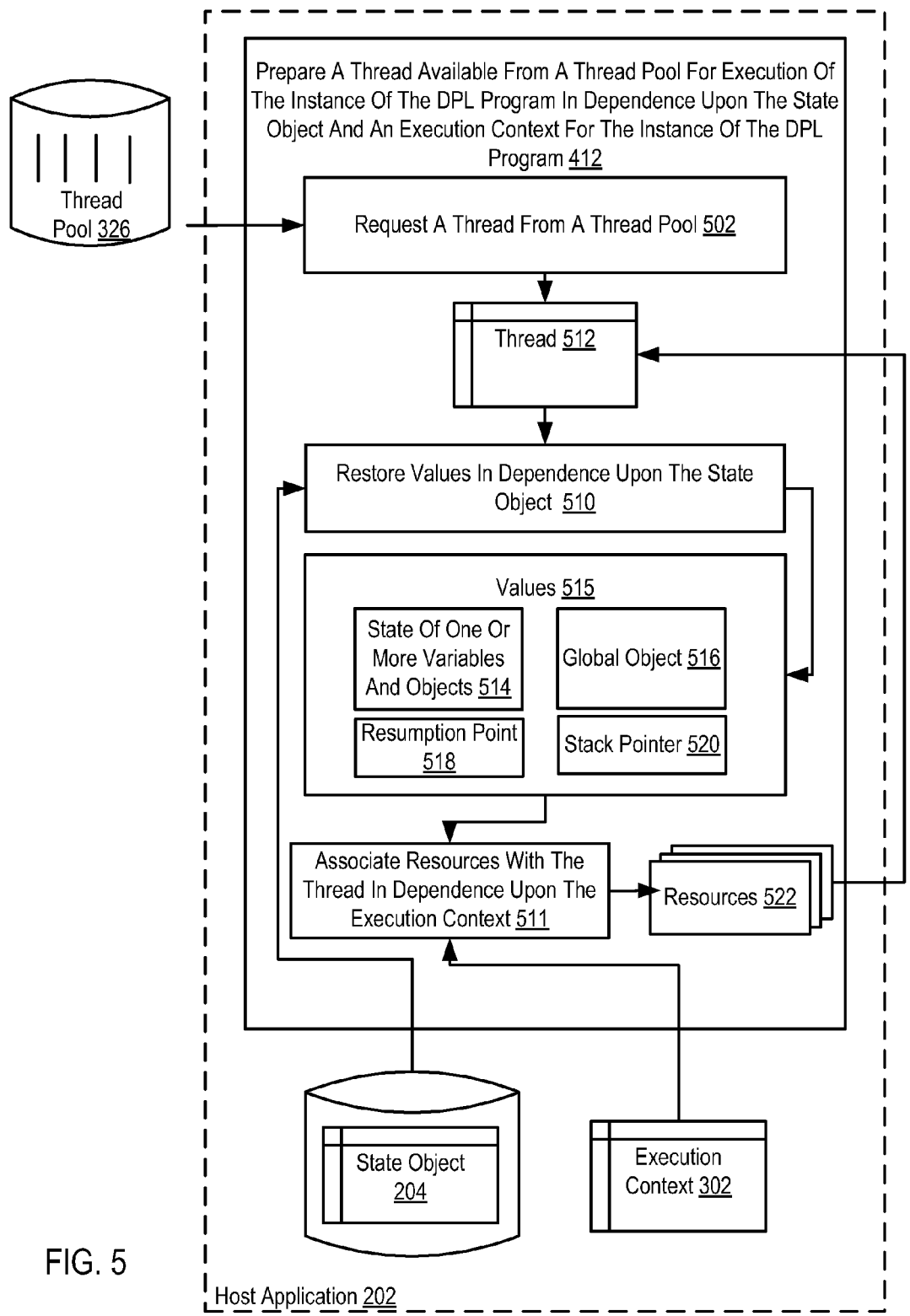
FIG. 5 sets forth a flow chart illustrating an example method of preparing a thread available from a thread pool for execution.

For further explanation, FIG. 5 sets forth a flow chart illustrating an example method of preparing a thread available from a thread pool for execution. In the method of FIG. 5, preparing (412), by the host application (202), a thread available from a thread pool (326) for execution of the instance of the DPL program includes requesting (502) a thread (512) from a thread pool (326). The thread pool (326) may include one or more threads. The thread pool (326) may dynamically increase or shrink depending upon the needs serviced by the application maintaining the thread pool such as the host application, an operating system, or another application.

In the method of FIG. 5, preparing (412) a thread (512) available from a thread pool (326) for execution of the instance of the DPL program includes restoring (510) the values for the instance DPL program in dependence upon the state object (204). Restoring (510) the values in dependence upon the state object (204) may be carried out by retrieving data indicating the previous state of the values of the DPL program from the state object (204) and loading the data retrieved from the state object (204) for use by the instance DPL program. In the example of FIG. 5, values (515) that are restored in dependence upon the state object (204) include the resumption point (518) of the instance of the DPL program, the global object (516), the state of one or more variables and objects (514) for the instance of the DPL program, and the stack pointer (520). The inclusion of these values illustrated in FIG. 5 are for explanation and not for limitation. As will occur to those of skill in the art, other values for execution of the instance of the DPL program may also be restored in preparing a thread for execution.

In the method of FIG. 5, preparing (412) a thread available from a thread pool (326) for execution of the instance of the DPL program also includes associating (511), with the thread (512), resources in dependence upon the execution context (302). Associating (511) resources in dependence upon the execution context (302) may be carried out by examining the execution context (302) and assigning resources identified in the execution context (302) to the thread (512) for use by the thread (512). Examples of such resources may include one or more JIT compilers for executing the DPL program, a garbage collector for reclaiming memory used by the DPL program, memory available to the thread, a processor assigned to the thread, data communications adapters for use in data communications, and other resources as will occur to those of skill in the art.

Figure 6:
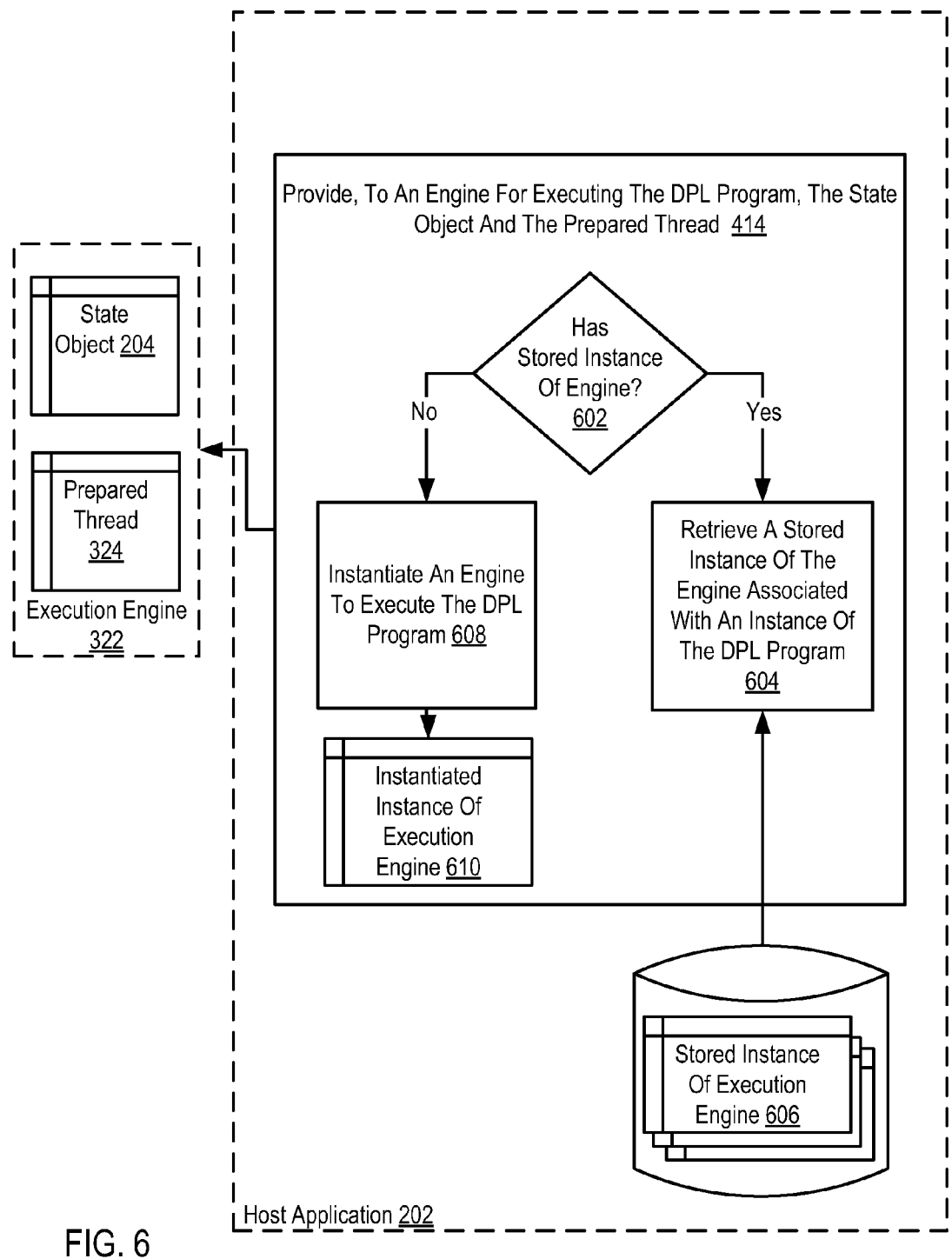
FIG. 6 sets forth a flow chart illustrating an example method of providing the state object and the prepared thread to an execution engine for executing the DPL program.

For further explanation, FIG. 6 sets forth a flow chart illustrating an example method of providing (414), by the host application (202) to an execution engine (322) for executing the DPL program, the state object (204) and the prepared thread (324) as mentioned above. In the method of FIG. 6, providing (414) the state object (204) and the prepared thread (324) to the execution engine (322) includes determining (602) whether the host application (202) has a stored instance (606) of an execution engine associated with the instance of the DPL program. If the host application (202) has a stored instance (606) of an execution engine associated with the instance of the DPL program, the method of FIG. 6 continues by retrieving (604) the stored instance (606) of the execution engine associated with an instance of the DPL program. If the host application does not have a stored instance (606) of an execution engine associated with the instance of the DPL program, in the method of FIG. 6 it continues by instantiating (608) an execution engine (610) to execute the DPL program. Alternatively, if the host application does not have a stored instance (606) of an execution engine associated with the instance of the DPL program, the method of FIG. 6 may continue by creating a new state instance representing that it is new, and instantiating (608) an execution engine (610) using this newly created stored instance to execute the DPL program.

Example embodiments are described largely in the context of a fully functional computer system for thread-agile DPL program execution. Persons skilled in the art will recognize that, although some of the example embodiments described in this specification are oriented to software installed and executing on computer hardware, alternative embodiments of thread-agile DPL program execution may be implemented as firmware or as hardware.

Thread-agile DPL program execution, furthermore, may be described in the general context of processor-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments. Readers of skill in the art will recognize, however, that example embodiments may be stored on or transmitted across some form of processor-readable media. Processor-readable media may be any available media that may be accessed by a computer. By way of example, and not limitation, processor-readable media may comprise "computer storage media" and "communications media."

"Computer storage media" include volatile and nonvolatile, removable and non-removable media implemented in any method or technology for storage of information such as processor-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which may be used to store the desired information and which may be accessed by a computer.

"Communication media" typically embodies processor-readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared, and other wireless media. Combinations of any of the above are also included within the scope of processor-readable media.

It will be understood from the foregoing description that modifications and changes may be made in various embodiments of thread-agile DPL program execution without departing from its true spirit. The descriptions in this specification are for purposes of illustration only and are not to be construed in a limiting sense.

What is claimed is:

1. A method, comprising:
receiving a message associated with an instance of a dynamic programming language (DPL) program, the message being provided by an execution context associated with a subsequent execution of the instance of the DPL program;
retrieving a stored state object for the instance of the DPL program identified by the message, wherein the stored state object includes a state of the instance of the DPL program when last executed;
requesting a thread from a thread pool to facilitate the subsequent execution of the instance of the DPL program;
providing the stored state object and the message to an execution engine to facilitate the subsequent execution of the instance of the DPL program using the thread requested from the thread pool; and
ascertaining whether the subsequent execution has paused due to the instance of the DPL program waiting for a response message from a web server and storing a current state of the instance of the DPL program in response to determining that the subsequent execution has paused.

2. The method of claim 1 further comprising deleting the stored state object when the instance of the DPL program finishes the subsequent execution.

3. The method of claim 1 further comprising returning the thread requested from the thread pool to the thread pool when the instance of the DPL program finishes the subsequent execution.

4. The method of claim 1 further comprising preparing the thread to perform the subsequent execution.

5. The method of claim 4, wherein the preparing depends on information ascertained from the stored state object.

6. The method of claim 4, wherein the preparing depends on the execution context associated with the subsequent execution.

7. A system to facilitate thread-agile dynamic programming language ('DPL') program execution, the system comprising:
a processor; and
a memory containing one or more programs to be executed by the processor, the one or more programs comprising a host application and an execution engine, the host application being configured to
receive a message associated with an instance of a DPL program, the message being provided by an execution context associated with a subsequent execution of the instance of the DPL program,
retrieve a stored state object associated with the instance of the DPL program, wherein the stored state object includes state information corresponding to a last execution of the instance of the DPL program, and
prepare a thread to perform the subsequent execution of the instance of the DPL program based at least on the execution context, the thread selected from a plurality of threads included in a thread pool;
the execution engine being configured to perform the subsequent execution of the instance of the DPL program on the thread prepared by the host application in accordance with the state information and the message; and
the host application being further configured to store a current state of the instance of the DPL program when the instance of the DPL program pauses the subsequent execution while waiting for a response message from a web server.

8. The system of claim 7, wherein the state information comprises at least one of a value of a resumption point for the instance of the DPL program, a global object, a stack pointer, a value for an execution parameter used by the instance of the DPL program, or a value associated with an operational environment in which the instance of the DPL program was executing.

9. The system of claim 7, wherein the host application is further configured to ascertain the execution context associated with the instance of the DPL program.

10. The system of claim 9, wherein the host application is further configured to prepare the thread based on the execution context.

11. The system of claim 10, wherein the host application is further configured to prepare the thread by allocating resources for the thread according to the execution context.

12. The system of claim 7, wherein the host application is further configured to prepare the thread by restoring values for the instance of the DPL program in accordance with the state information.

13. The system of claim 7, wherein the host application comprises a web browser and the instance of the DPL program is a web worker.

14. A computer program product that facilitates thread-agile dynamic programming language ('DPL') program execution, the computer program product disposed upon a computer storage memory, the computer program product comprising computer program instructions that, when executed, cause a computer to carry out the steps of:

receiving a message associated with an instance of a DPL program, the message being provided by an execution context associated with a subsequent execution of the instance of the DPL program;

retrieving a stored state object, wherein the stored state object includes including state information associated with a last execution of the instance of the DPL program;

preparing a thread to facilitate the subsequent execution of the instance of the DPL program, the thread requested from a thread pool;

performing the subsequent execution of the instance of the DPL program on the thread based on the state information and the execution context; and storing a current state of the instance of the DPL program when the instance of the DPL program pauses the subsequent execution while waiting for a response message from a web server.

15. The computer program product of claim 14 further comprising program instructions that, when executed, cause the computer to return the thread to the thread pool when the instance of the DPL program pauses the subsequent execution.

16. The computer program product of claim 14 further comprising program instructions that, when executed, cause the computer to delete the stored state object when the instance of the DPL program finishes the subsequent execution.

17. The computer program product of claim 14 further comprising program instructions that, when executed, cause the computer to pass the message to an execution engine, wherein the subsequent execution is performed on the execution engine.

18. The computer program product of claim 14, wherein the preparing further comprises associating resources with the thread according to the execution context associated with the instance of the DPL program, wherein the resources include a just-in-time compiler.

* * * * *